United States Patent
Requejo et al.

(10) Patent No.: US 9,896,017 B1
(45) Date of Patent: Feb. 20, 2018

(54) CONVERTIBLE TRAILER

(71) Applicant: CGS Premier, Inc., New Berlin, WI (US)

(72) Inventors: James Requejo, Shorewood, WI (US); Bradley Thomas, Wind Lake, WI (US); Greg Peterson, Hartland, WI (US)

(73) Assignee: CGS Premier, Inc., Muskego, WI (US)

( * ) Notice: Subject to any disclaimer, the term of this patent is extended or adjusted under 35 U.S.C. 154(b) by 18 days.

(21) Appl. No.: 15/237,662

(22) Filed: Aug. 16, 2016

(51) Int. Cl.
| B60P 3/37 | (2006.01) |
| B60P 3/34 | (2006.01) |
| B60D 1/06 | (2006.01) |
| B62D 63/06 | (2006.01) |
| B60S 9/04 | (2006.01) |

(52) U.S. Cl.
CPC ............. B60P 3/34 (2013.01); B60D 1/06 (2013.01); B60S 9/04 (2013.01); B62D 63/061 (2013.01)

(58) Field of Classification Search
CPC ........ H04N 5/913; H04N 2005/91314; H04N 2005/91371; B60P 3/42; B62D 63/061; A47L 23/266; A47L 23/22; G09F 19/22
USPC .......................................................... 296/162
See application file for complete search history.

(56) References Cited

U.S. PATENT DOCUMENTS

| 2,811,111 | A | * | 10/1957 | Levitz | ....................... | A21B 7/00 104/126 |
| 3,574,388 | A | * | 4/1971 | Stone | ....................... | B60P 3/32 280/43.23 |
| 3,705,743 | A | * | 12/1972 | Toomey | ................... | B60P 3/36 211/94.01 |
| 3,708,198 | A | * | 1/1973 | Coons | ....................... | B60P 3/36 182/115 |
| 3,709,551 | A | * | 1/1973 | McCarthy | ................. | B60P 3/34 296/170 |
| 3,850,470 | A | * | 11/1974 | Trelle | ....................... | B60P 3/32 296/165 |
| 3,909,057 | A | * | 9/1975 | Guthry | .................. | B60P 3/1041 280/414.1 |
| 4,072,337 | A | * | 2/1978 | Barker | ...................... | B60P 3/34 114/344 |
| 4,127,300 | A | * | 11/1978 | Melley | .................... | F02B 63/04 290/1 R |

(Continued)

Primary Examiner — Kiran B Patel
(74) Attorney, Agent, or Firm — Michael Best & Friedrich LLP

(57) ABSTRACT

A convertible trailer includes a frame including a tongue portion arranged to facilitate towing by a vehicle, a main portion supported by the frame and defining a portion of a space, and an end portion coupled to the main portion and cooperating with the main portion to define the space. A porch cover is pivotably coupled to the main portion for movement between a stowed position and a deployed position and a porch floor is pivotably coupled to the main portion for movement between a stowed position and a deployed position, the porch cover and the porch floor cooperating to define a porch when in the deployed position. A front door is formed as part of the main portion and provides a passage between the space and the porch. An end door is formed as part of the end portion and is arranged to provide access to the space. A plurality of removable support members is positioned beneath the porch floor and arranged to support the porch floor in the deployed position.

20 Claims, 4 Drawing Sheets

(56) References Cited

U.S. PATENT DOCUMENTS

| | | | | |
|---|---|---|---|---|
| 4,133,572 | A * | 1/1979 | Robbins | B60P 3/14 280/789 |
| 4,149,748 | A * | 4/1979 | Tanner | B60S 9/08 280/789 |
| D266,235 | S * | 9/1982 | Hughes | D12/101 |
| 4,347,638 | A * | 9/1982 | Weaver | B60R 3/02 14/71.1 |
| 4,413,855 | A * | 11/1983 | Flanagan | B60P 3/32 296/162 |
| 4,535,933 | A * | 8/1985 | Kuiper | B60P 3/0252 237/12.3 A |
| 4,854,631 | A * | 8/1989 | Laursen | B60P 3/32 14/71.1 |
| 4,869,030 | A * | 9/1989 | Clark | B60P 3/32 182/88 |
| 4,874,197 | A * | 10/1989 | Grable | B60P 3/32 182/88 |
| 5,193,878 | A * | 3/1993 | Weaver | B60P 3/32 296/162 |
| 6,755,155 | B2 * | 6/2004 | May | A01K 1/0236 119/400 |
| 6,869,092 | B1 * | 3/2005 | Henn | B60R 3/02 280/166 |
| D551,128 | S * | 9/2007 | Renard | D12/102 |
| 7,967,369 | B2 * | 6/2011 | Davidson | B60P 3/341 296/173 |
| 8,317,254 | B2 * | 11/2012 | Scott-Greavu | B60P 3/36 280/415.1 |
| 8,443,759 | B2 * | 5/2013 | Nagely | A01K 1/0035 119/416 |
| 8,550,528 | B2 * | 10/2013 | Sidi | B60P 3/34 296/26.02 |
| 8,955,897 | B1 * | 2/2015 | Miller | B60P 3/14 296/24.32 |
| 2002/0153747 | A1 * | 10/2002 | Ropp | B60P 3/14 296/24.45 |
| 2008/0296922 | A1 * | 12/2008 | Diamond | B60P 3/34 296/26.13 |
| 2009/0272046 | A1 * | 11/2009 | Letscher, III | E04L 31/003 52/79.6 |
| 2010/0036707 | A1 * | 2/2010 | Gilchrist | G06Q 10/087 280/656 |
| 2013/0154296 | A1 * | 6/2013 | Blackwell | A61G 3/001 296/24.38 |
| 2017/0232880 | A1 * | 8/2017 | Peterson | B60P 3/025 296/21 |

* cited by examiner

CONVERTIBLE TRAILER

BACKGROUND

The invention relates to movable trailers and more particularly to movable trailers that are convertible between two different configurations.

Trailers are sometimes used to provide office or display space at conventions, trade shows, or other meetings. These trailers must be transported from storage locations to a location where it will be used. Rather, than transporting the trailer on a separate truck, it is sometimes convenient for the trailer to be transportable as one piece.

SUMMARY

In one construction, a convertible trailer includes a towable frame, a plurality of wheels coupled to the frame, and a space defined by a plurality of walls and supported by the frame. A movable porch is coupled to the room and is pivotable between a stowed position and a display position and a movable roof is coupled to the room and is pivotable between a stowed position and a display position in which the roof covers at least a portion of the porch. A first entryway is positioned adjacent the porch to facilitate movement into and out of the room from the porch and an end portion extends from a first end of the room. A second entryway is formed as part of the end portion to facilitate movement into and out of the room from a point spaced apart from the porch, and a plurality of support members are each coupled to one of the room and the porch, each support member is separately movable between a stowed position and a support position.

In another construction, a convertible trailer includes a frame including a tongue portion arranged to facilitate towing by a vehicle, a main portion supported by the frame and defining a portion of a space, and an end portion coupled to the main portion and cooperating with the main portion to define the space. A porch cover is pivotably coupled to the main portion for movement between a stowed position and a deployed position and a porch floor is pivotably coupled to the main portion for movement between a stowed position and a deployed position, the porch cover and the porch floor cooperating to define a porch when in the deployed position. A front door is formed as part of the main portion and provides a passage between the space and the porch. A plurality of removable support members is positioned beneath the porch floor and arranged to support the porch floor in the deployed position.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
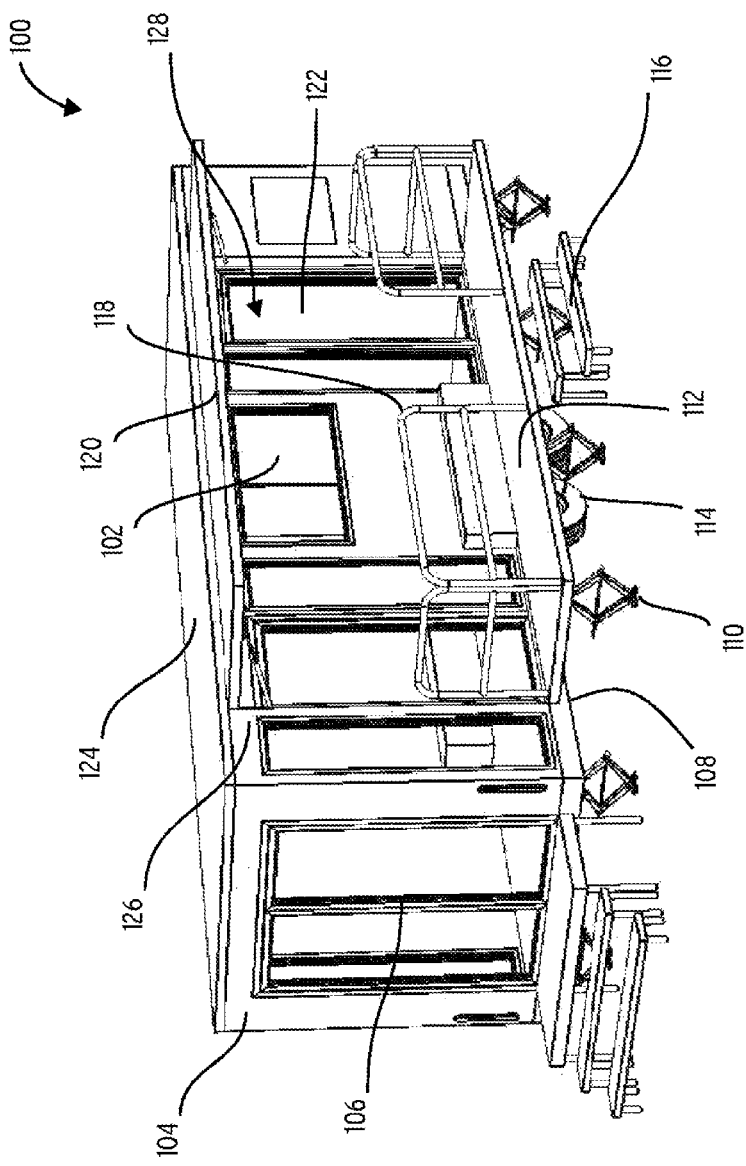
FIG. 1 is a perspective view of a convertible trailer in a deployed or display configuration.

FIG. 1 illustrates a convertible trailer 100 that is well-suited for use in a deployed or display configuration in which it can be used as an office or display area and a travel or stowed configuration in which it can be transported from location to location on roadways as may be required. The convertible trailer 100 includes a main portion 124 and an end portion 104 that together define an interior space 128 that can be used by end users as desired. Each of the main portion 124 and the end portion 104 are supported by a frame 108 that in turn is supported by a plurality of wheels 114 that also facilitate the transport of the convertible trailer 100.

In the illustrated construction, the main portion 124 is rectangular and is defined by a plurality of walls 126 that includes two elongated sides, and a front end. The end portion 104 extends from a rear end of the main portion 124 and may also be rectangular. While the illustrated construction includes an end portion 104 that is the same width as the main portion 124, some constructions may include an end portion 104 that is narrower than the main portion 124.

When in the deployed position, one of the sides of the main portion 124 becomes the front of the trailer 100. A porch cover 120 and a porch floor 112 deploy from the side of the convertible trailer 100 to define a porch that expands the space available in the convertible trailer 100. In the illustrated construction, and as is better illustrated in FIG. 2 and FIG. 3 the porch cover 120 pivots along a top hinge joint between the deployed position of FIG. 1 and the travel position shown in FIG. 2. Similarly, the porch floor 112 pivots along a lower hinge joint between the deployed position of FIG. 1 and the travel position shown in FIG. 2. A railing 118 is positioned around some or all of the porch floor 112 to inhibit occupants from stepping off of the porch floor 112 at an undesired location. In addition, stairs 116 are provided to allow easy access to the porch floor 112.

In some constructions, the porch floor 112 includes a biasing member that biases the floor 112 upward toward the stowed position to assist a user in moving the floor 112 between the stowed and in use positions. In one construction, a torsional spring is used as the biasing member with other biasing members being possible. Similar biasing members could also be used with the porch cover 120 if desired.

The main portion 124 includes a front door 122 that provides for easy access between the porch floor 112 and the interior space 128 of the trailer 100. In the illustrated construction, a pivoting door 122 is provided, preferably with a door closer, with other types of doors also being possible. Additional doors 122 and a window 102 are also provided in the side as may be desired. In other constructions, a plurality of windows or additional doors could be provided or omitted as may be desired for the particular application.

The end portion 104 of the illustrated construction includes an end door 106 that provides additional access to the interior of the convertible trailer 100. Again, the end door 106 is a pivoting door, preferably with a closer, with other types of doors being possible. Of course, other constructions may include windows, additional doors, or a combination of doors and windows in the end portion as may be required. In still other constructions, the door 106 is omitted and only windows are included in the end portion 104.

In preferred constructions, the doors 106, 112 include locks and door closer mechanisms. The locks provide security for the contents of the trailer 100, while the closers assure that the doors remain closed when not in use.

To facilitate transport of the convertible trailer 100 the frame 108 is supported by wheels 114 that are positioned as required for transportation. The positioning of the wheels 114 may not provide the desired level of support for the convertible trailer 100 when in the deployed position. Therefore, a plurality of support members 110 are provided and located to better support the convertible trailer 100. In the illustrated construction, individually adjustable scissors jacks are used as support members 110 with other arrangements and support members 110 being possible (e.g., bull jacks, etc.).

Figure 2:
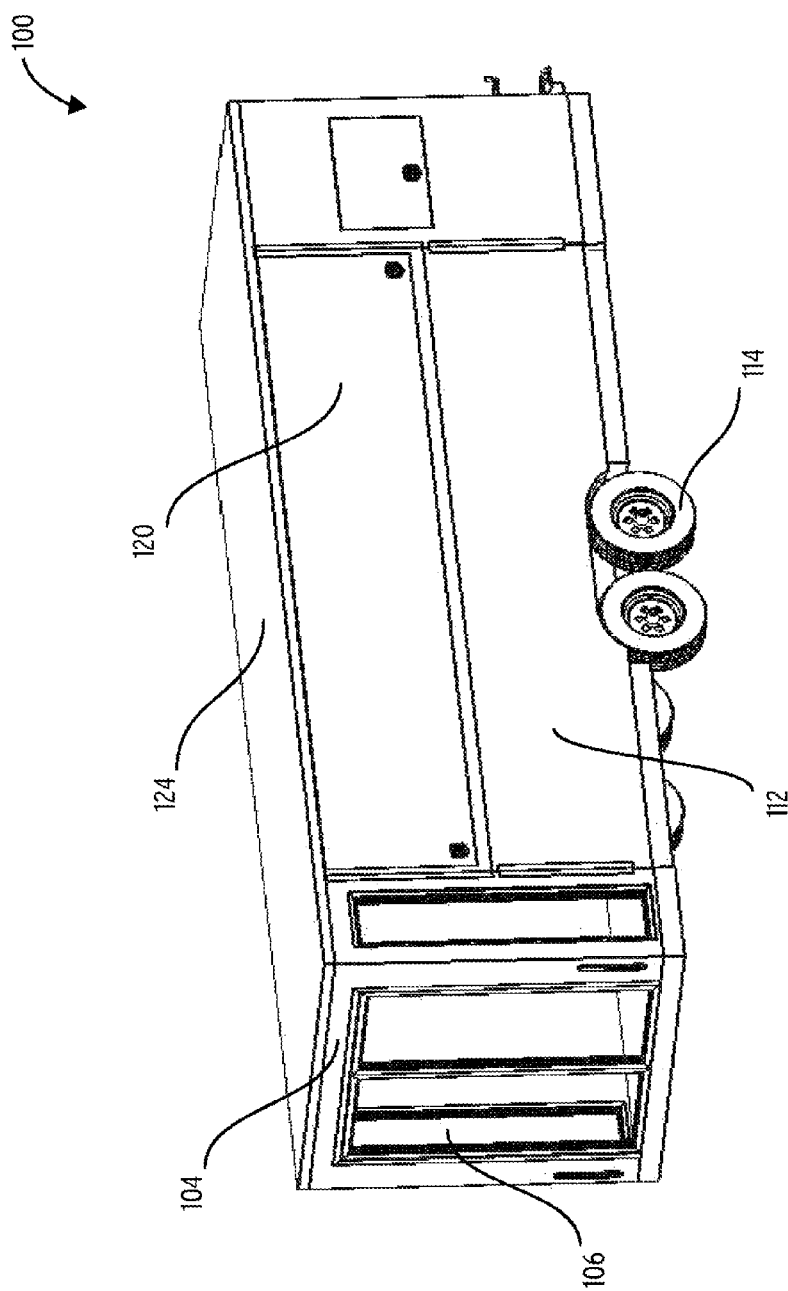
FIG. 2 is a perspective view of the trailer of FIG. 1 in a travel or stowed configuration.

FIG. 2 illustrates the convertible trailer 100 in the travel configuration. In this configuration, the porch cover 120 and the porch floor 112 are folded against the side of the convertible trailer 100. In this arrangement, the convertible trailer 100 is narrower and the porch cover 120 and the porch floor 112 provide some protection for the front door 122 and the window 102. This arrangement of the porch cover 120 and the porch floor 112 is sometimes referred to as a clamshell arrangement.

As illustrated in FIG. 2, the wheels 114 are positioned at a point that provides the necessary balance for transporting the convertible trailer 100. In addition, the support members 110 are removed and stowed for transport. In some constructions, the support members 110 remain connected to the convertible trailer 100 but move to a stowed position, with other constructions having removable support members 110.

Figure 3:
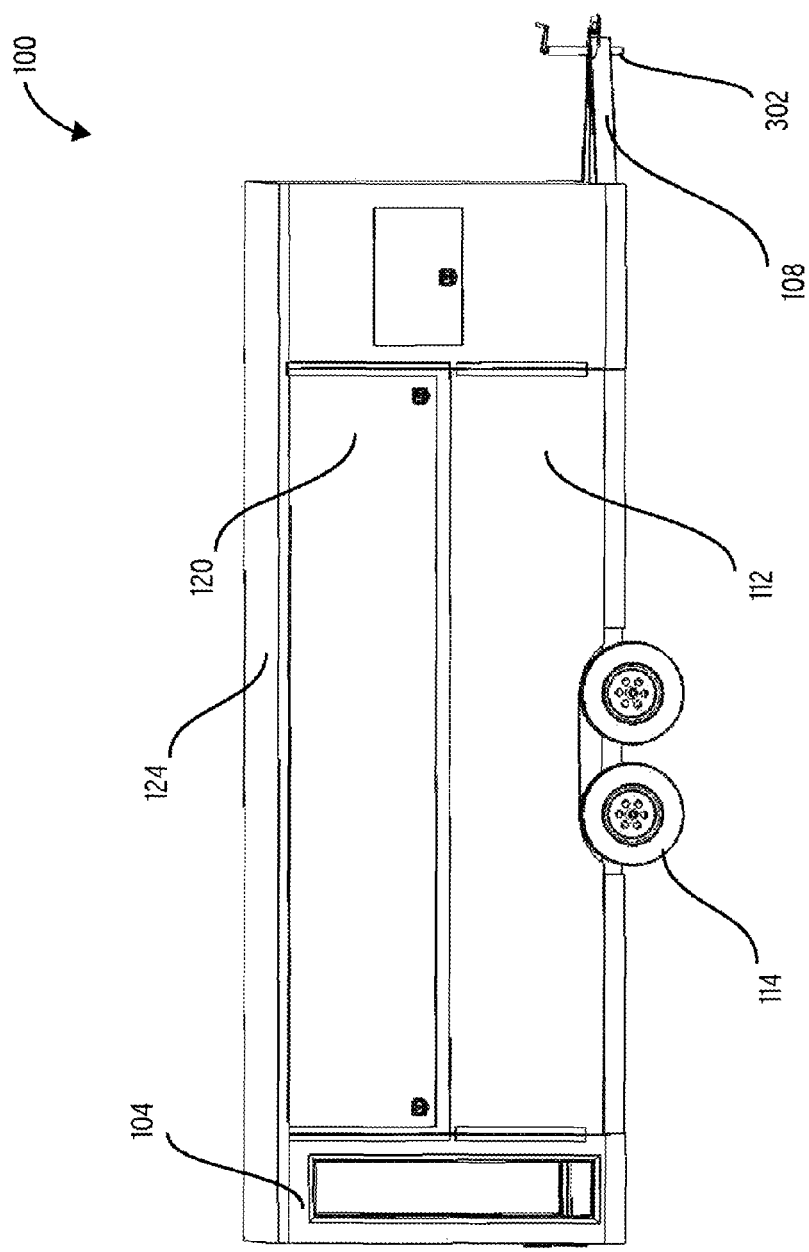
FIG. 3 is a side view of the trailer of FIG. 1 in the travel or stowed configuration.

As illustrated in FIG. 3, the frame 108 includes a tongue portion that is arranged to connect directly to a tow vehicle to facilitate transport. The tongue portion includes a ball and socket type trailer hitch with other arrangements also being possible. The tongue also supports a front leg 302 that can be used to support and level the convertible trailer 100 when in the deployed configuration.

Figure 4:
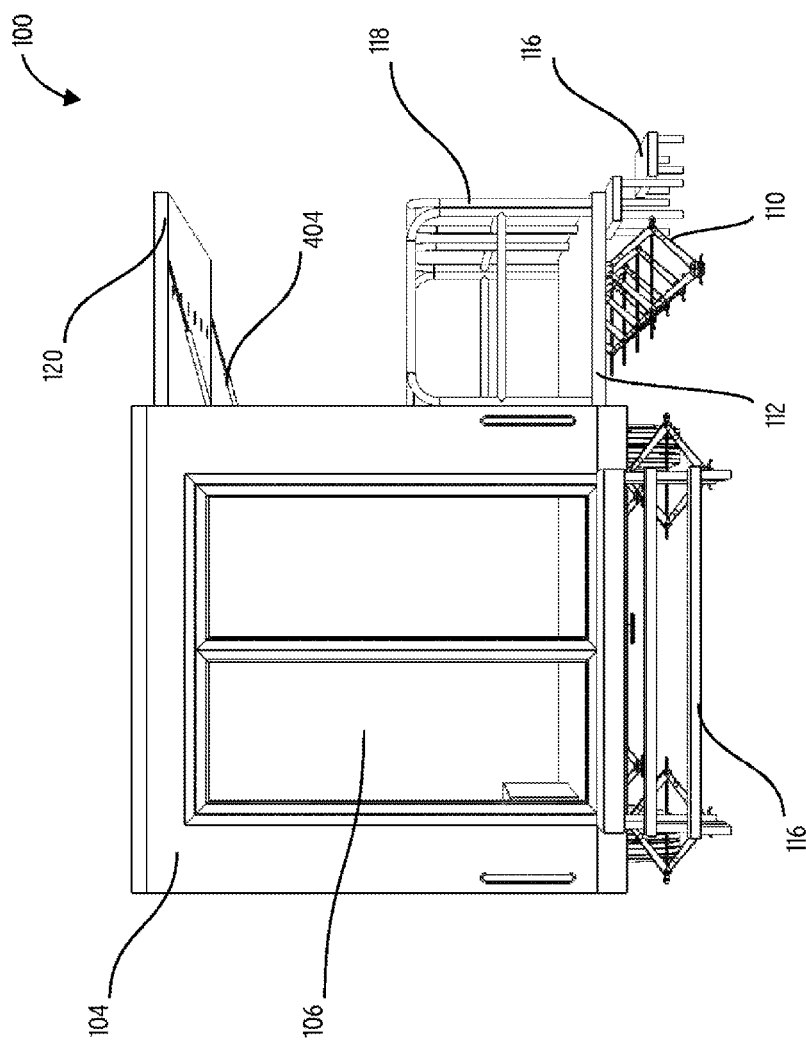
FIG. 4 is an end view of the trailer of FIG. 1 in the deployed or display configuration.

FIG. 4 illustrates an end view of the convertible trailer 100 that better illustrates the end door 106. In addition, FIG. 4 better illustrates the support members 110 in operation. As can be seen, a row of support members 110 is arranged to support the porch floor 112 with additional support members 110 positioned beneath the main portion 124 and the end portion 104 to provide additional support and stability where required.

With continued reference to FIG. 4, several actuators 404 are used to support the porch cover 120 in the deployed position. In the illustrated construction, pneumatic or hydraulic actuators are used as the actuators 404. Of course, other arrangements that support the porch cover 120 in the deployed position are contemplated and possible.

In use, a user transports the convertible trailer 100 to a location where it is to be set up and used. To transport the device, the frame 108 attaches via the tongue portion to a tow vehicle which tows the convertible trailer 100 to the desired location. Upon arrival, the convertible trailer 100 is disconnected from the tow vehicle and is positioned as desired. The porch floor 112 is then moved from the stowed position to the deployed position and the porch cover 120 is similarly moved from the stowed position to the deployed position. The railing 118 is coupled to the porch floor 112 to limit access to and from the porch. The stairs 116 are then positioned adjacent the porch and the end portion 104 to provide easy access.

The support members 110 are removed from their stowed position and are placed in the desired locations beneath the convertible trailer 100 to provide the desired support and stability for use.

When use of the convertible trailer 100 is complete, the process is reversed to convert the convertible trailer 100 back to the stowed position. The railing 118 and stairs 116 are removed and the porch cover 120 and porch floor 112 are folded into their stowed positions. The support members 110 are then removed and stored for transportation or are moved to their stowed positions. The convertible trailer 100 is then connected to a tow vehicle for transport as may be required.

Various features and advantages of the invention are set forth in the following claims.

What is claimed is:

1. A convertible trailer comprising:
a towable frame;
a plurality of wheels coupled to the frame;
a room defined by a plurality of walls and supported by the frame;
a movable porch coupled to the room and pivotable between a stowed position and a display position;
a movable roof coupled to the room and pivotable between a stowed position and a display position in which the roof covers at least a portion of the porch;
a first entryway positioned adjacent the porch to facilitate movement into and out of the room from the porch;
an end portion extending from a first end of the room;
a second entryway formed as part of the end portion to facilitate movement into and out of the room from a point spaced apart from the porch; and
a plurality of support members each coupled to one of the room and the porch, each support member separately movable between a stowed position and a support position.

2. The convertible trailer of claim 1, wherein the frame comprises a tongue portion including a socket of a ball and socket trailer hitch and a front leg.

3. The convertible trailer of claim 1, wherein the plurality of walls comprises a side wall, and wherein the first entryway is formed in the side wall.

4. The convertible trailer of claim 3, wherein the movable porch and the movable roof cover the first entryway when in the stowed position.

5. The convertible trailer of claim 1, wherein the first entryway comprises a hinged door.

6. The convertible trailer of claim 1, wherein each of the plurality of support members comprises a scissors jack.

7. The convertible trailer of claim 1, wherein each of the plurality of support members is removable from the convertible trailer when in the stowed position.

8. The convertible trailer of claim 1, wherein the first entryway comprises a sliding door.

9. The convertible trailer of claim 1, further comprising at least one support member positioned beneath the end portion to support the end portion.

10. The convertible trailer of claim 1, wherein the movable porch and the movable roof do not overlap with the end portion when in the stowed position.

11. The convertible trailer of claim 1, wherein the second entryway comprises a hinged door.

12. The convertible trailer of claim 1, wherein the second entryway comprises a sliding door.

13. The convertible trailer of claim 1, wherein the end portion further includes a window distinct from the second entryway.

14. The convertible trailer of claim 13, wherein the window of the end portion is not covered by the movable porch or the movable roof when in the stowed position.

15. The convertible trailer of claim 1, wherein the plurality of walls includes a side wall containing the first entryway, and wherein the second entryway in the end portion is in a wall perpendicular to the side wall.

16. The convertible trailer of claim 1, wherein the second entryway is not accessible from the movable porch when the movable porch is in the display position.

17. The convertible trailer of claim 1, wherein the tongue portion is at an opposite end of the frame from the end portion.

18. A convertible trailer comprising:
a towable frame;
a plurality of wheels coupled to the frame;
a room defined by a plurality of walls and supported by the frame;
a movable porch coupled to the room and pivotable between a stowed position and a display position;
a movable roof coupled to the room and pivotable between a stowed position and a display position in which the roof covers at least a portion of the porch;
a first entryway positioned adjacent the porch to facilitate movement into and out of the room from the porch, wherein the movable porch and the movable roof cover the first entryway when the movable porch and the movable roof are in the stowed position;
an end portion extending from a first end of the room, wherein the movable porch and the movable roof do not overlap with the end portion when the movable porch and the movable roof are in the stowed position;
a second entryway formed as part of the end portion to facilitate movement into and out of the room from a point spaced apart from the porch; and
a plurality of support members each coupled to one of the room and the porch, each support member separately movable between a stowed position and a support position.

19. The convertible trailer of claim 18, wherein the end portion further includes a window distinct from the second entryway.

20. The convertible trailer of claim 18, wherein the plurality of walls includes a side wall containing the first entryway, and wherein the second entryway in the end portion is in a wall perpendicular to the side wall.

* * * * *